United States Patent [19]

Dublinski et al.

[11] Patent Number: 5,356,586

[45] Date of Patent: Oct. 18, 1994

[54] METHOD OF FABRICATING A STRUCTURAL MEMBER HAVING A STIFFENER BEAD THEREIN

[75] Inventors: Alexander C. Dublinski, Northford; Edward J. Fabian, Oxford; Philip J. Ramey, Milford; Darryl M. Toni, North Haven, all of Conn.

[73] Assignee: United Technologies Corporation, Hartford, Conn.

[21] Appl. No.: 81,766

[22] Filed: Aug. 9, 1993

Related U.S. Application Data

[62] Division of Ser. No. 687,795, Apr. 19, 1991, Pat. No. 5,271,986.

[51] Int. Cl.$^5$ .............................................. B29C 67/14
[52] U.S. Cl. .................................... 264/258; 156/196; 156/222; 156/285; 264/313; 264/510
[58] Field of Search ............... 264/258, 313, 510, 511; 156/196, 221, 222, 285

[56] References Cited

U.S. PATENT DOCUMENTS

| | | | |
|---|---|---|---|
| 1,944,280 | 1/1934 | Snyder | 428/178 |
| 3,146,148 | 8/1964 | Mitchella et al. | 264/511 |
| 4,053,667 | 10/1977 | Smith | 156/285 |
| 4,683,099 | 7/1987 | Buxton et al. | 264/258 |
| 5,152,949 | 10/1992 | Leoni et al. | 264/257 |
| 5,286,438 | 2/1994 | Dublinski et al. | 264/258 |

FOREIGN PATENT DOCUMENTS 1216990 12/1970 United Kingdom .

OTHER PUBLICATIONS

*Journal of Aircraft*, No. 11, p. 955 (D. R. Tenney et al. "Material and Structures for Hypersonic Vehicles").

*Primary Examiner*—Jay H. Woo
*Assistant Examiner*—Robert B. Davis

[57] ABSTRACT

A method of fabricating a structural member having a stiffener bead therein. Prepreg plies or layers of high tensile strength fabric are laid up on a conformable caul plate. A rubber-like plug is prefabricated to the shape of the stiffener bead and is urged into a stiffener bead cavity of the caul plate by a metal tool to sandwich the prepreg plies between the caul and the plug. The caul and the plug cooperate to cause the prepreg plies to conform to the desired shape of the stiffener bead.

6 Claims, 6 Drawing Sheets

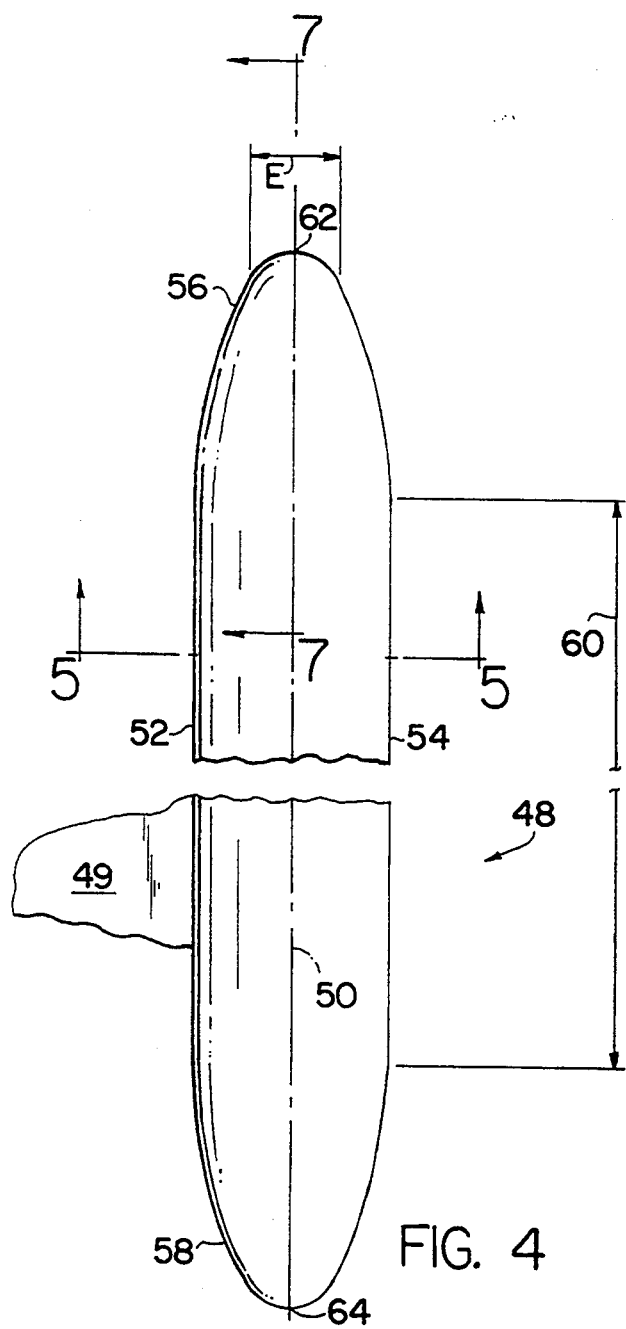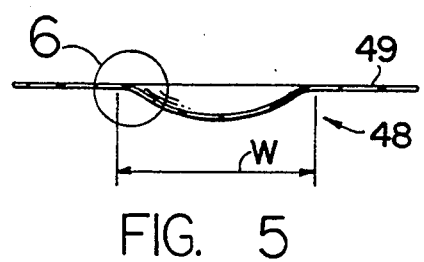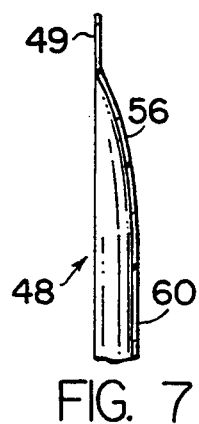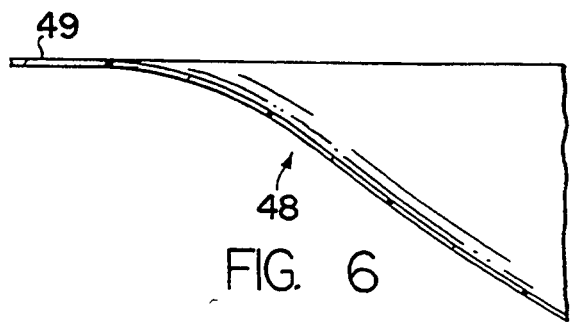
FIG. 4
FIG. 5
FIG. 7
FIG. 6

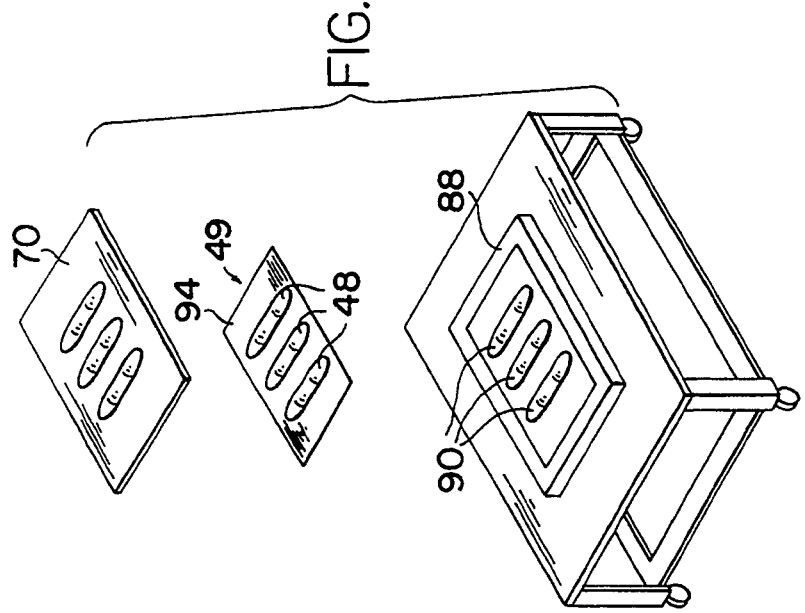
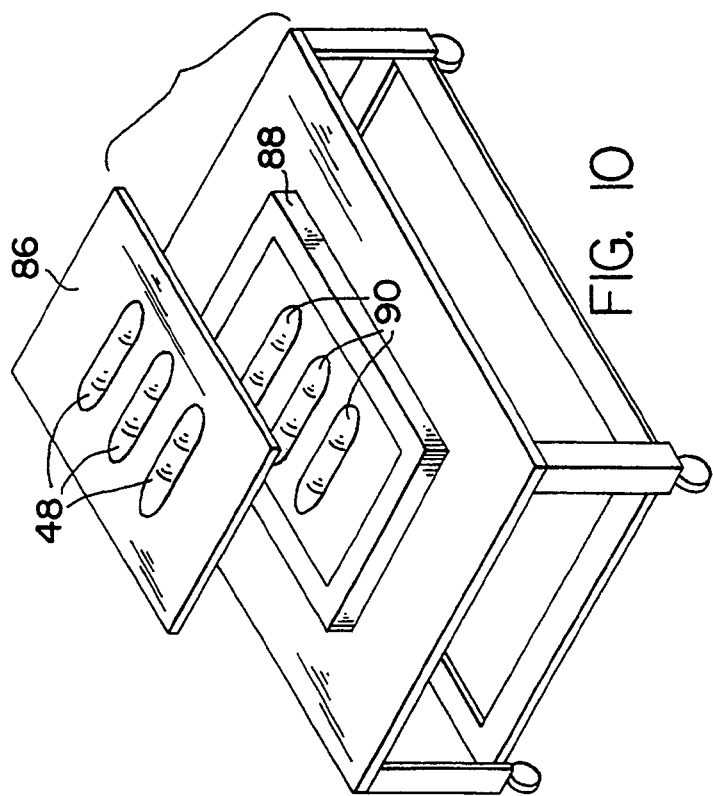

PEAK STRAIN = .00150

METHOD OF FABRICATING A STRUCTURAL MEMBER HAVING A STIFFENER BEAD THEREIN

This is a division of copending application Ser. No. 07/687,795 filed on Apr. 19, 1991 now U.S. Pat. No. 5,271,986.

TECHNICAL FIELD

This invention relates to light weight structural members and the method of making same which comprise bonded plies of high strength fabric which extend for the full height and width of a structural member and are continuous in forming the stiffener bead in the member. These structural members are of the type intended for use in aircraft so that they must be light in weight, be of substantial strength, and must be fabricatable utilizing labor saving devices.

BACKGROUND OF THE INVENTION

Structural members to be used in aircraft are preferably made of composite material where possible so as to gain the advantages of lightness of weight and ease of manufacture compared to those made of metal. Further, the design to costs targets for aircraft made of composite materials requires a significant reduction in fabrication costs.

Such structural members made of composites may be of the sandwich construction, however, a weight saving thereover can be made by fabricating the structural member from bonded plies of composite material having stiffener beads therein.

The stiffener beads of the prior art produce the advantages of lightness of weight, however, in view of the shape of the prior art stiffener beads, the composite material ply had to be darted and spliced during the ply lay-up process. This was a very time consuming process which produced a weak section in the structural member at the area of the darting and splicing and which prevented visual inspection of the ply bonding.

To overcome the requirement for darting and splicing of each composite ply required in fabrication of the prior art stiffener bead structural members, we have developed such a structural member in which a uniquely shaped stiffener bead and a unique fabrication process permits the fabrication of the structural member without the need for ply darting and splicing.

DISCLOSURE OF THE INVENTION

Therefore, it is an object of this invention to provide a structural member made of bonded layers of high strength fabric and which includes at least one stiffener bead in the wall thereof which is fabricated without the need for ply darting or splicing.

It is still a further object of this invention to provide such a structural member in which the wall portion of the structural member and the stiffener bead is made of bonded continuous and uninterrupted plies of high tensile strength fabric which extend for the full length and width of the structural member and which are continuous and uninterrupted in forming the stiffener bead.

It is still a further object of this invention to provide such a structural member in which the stiffener bead is shaped so as to have straight sides in the central portion thereof and to have substantially elliptically shaped ends.

It is still a further object of this invention to provide such a structural member in which the stiffener bead projects from the wall portion of the structural member at its central portion and is shaped to define a sector of a circle when viewed in cross-section, and wherein the stiffener bead joins the wall member tangentially.

It is still a further object of this invention to provide such a structural member in which the stiffener bead is approximately twice as wide at its central portion as the diameter of the substantially circular tips of the elliptical ends.

It is still a further object of this invention to provide such a structural member and the method of manufacturing same which constitutes a saving in the time of fabrication, reduced weight of the final product, which results in excellent bonding between the composite material plies, and which produces a product of increased strength over the prior art construction.

It is a further feature of this invention that the structural member can be fabricated utilizing many associated composite fabrication processes, such as autoclave, compression molding and resin injection molding.

It is still a further object of this invention to provide the method of fabricating such a structural member in which the structural member is fabricated by laying up prepreg plies or layers of high tensile strength fabric on a conformable caul plate which defines one side or surface of the finished product, and to utilize a rubber-like plug prefabricated to the shape of the stiffener bead, and which plug is located in the stiffener bead cavity of the conformable caul plate to sandwich the prepreg plies between the caul and the plug, as the caul plate so laid up and the rubber-like plug is positioned against a metal tool. The metal tool cooperates with the rubber-like plug to define the other side or surface of the composite member under fabrication. The conformable caul and a rubber-like plug cooperates to cause the prepreg plies to conform to the desired shape of the stiffener bead as defined by the compliant caul bead cavity as the coaction therebetween causes the prepreg plies to bear against the caul stiffener bead cavity throughout the full surface thereof without wrinkling or distortion of the ply during the molding process.

It is an object of this invention to provide a method of producing low cost, high quality composite components using a repeatable process.

It is still a further object of this invention to provide such a process in which the rubber-like plug is free floating with respect to the conformable caul and the metal tool, both during the precuring assembly process and during the curing process.

It is still a further object of this invention to provide such a method in which a foam cradle is provided and shaped to support the conformable caul in the proper shape during the prepreg ply lay-up thereon.

Other objects, features and advantages of the invention will become apparent in light of the following description thereof.

BRIEF DESCRIPTION OF THE DRAWINGS

FIG. 4 is a showing looking into the cavity of our novelty shaped stiffener bead formed as an integral part of a structural member fabricated from composite materials.

FIG. 5 is a view taken along FIG. 5—5 of FIG. 4.

FIG. 6 is a view taken at circle 6 of FIG. 5.

FIG. 7 is a view taken along line 7—7 of FIG. 4.

FIGS. 8 through 11 illustrate sequential steps in our fabrication process.

BEST MODE FOR CARRYING OUT THE INVENTION

In the aircraft field, and in many other fields, it is desirable to fabricate the product from parts which are light in weight, which are readily producible both inexpensively and in a minimum of man hours, which are capable of withstanding the loads to which it will be subjected, and which are readily inspectable for defects.

Figure 1:
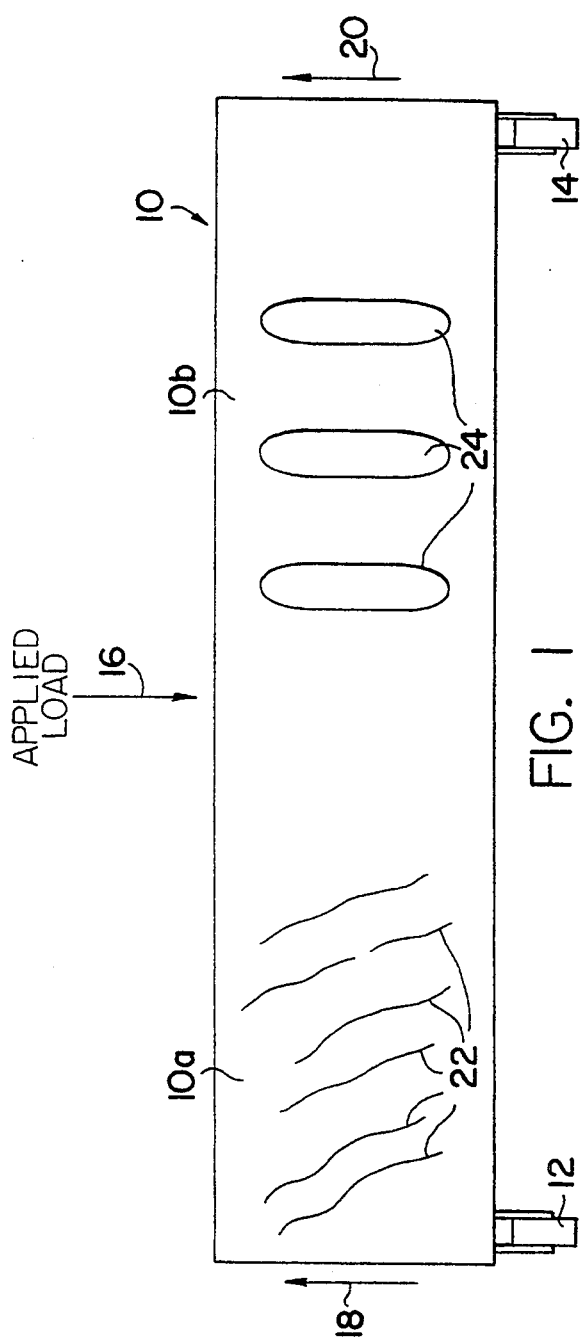
FIG. 1 is a showing of a typical structural member of the type of interest and which can be fabricated using our process.

Such structural members as beams, frames, bulkheads and decks in aircraft and other modern products are preferably fabricated from composite materials to gain the weight saving, strength, and labor and cost saving advantages thereof. These structural members must, however, be able to withstand the loads which will be imposed upon them during operation, such as the operation of a helicopter. Those loads will best be appreciated by considering FIG. 1 which shows such a structural member 10, which may be an I-beam extending between two frames 12 and 14 of a helicopter and supporting a load shown as 16 in the center thereof. Frames 12 and 14 will impose loads depicted as arrows 18 and 20 at the opposite ends of structural member 10 and, since the applied load is imposing the load 16 depicted by arrow in the opposite direction to loads 18 and 20, shear loads will be imposed across structural member 10. If structural member 10 constitutes a flat panel as shown on the left side 10a thereof, these shear loads will eventually create wrinkles shown at 22 in the panel shaped structural member 10 as a prelude to failure of the member. If, however, structural member or panel 10 includes stiffener beads, such as 24, therein, as shown on the right said 10b, the structural member is capable of withstanding a substantially higher shear load.

To explain our invention and the advantages to be gained by use thereof, it is deemed best to first consider the prior art construction.

Figure 2:
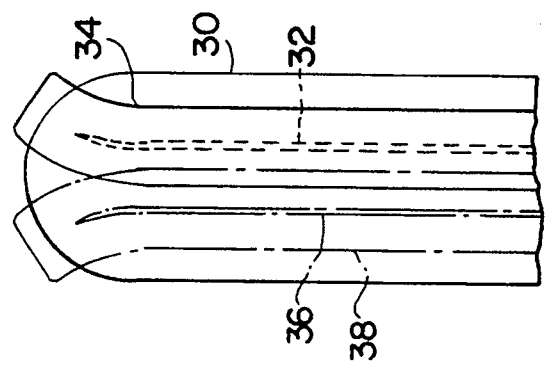
FIG. 2 is a showing of one half of the prior art stiffener bead to illustrate its method of manufacture.
Figure 3:
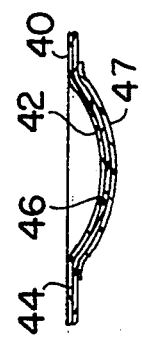
FIG. 3 is a cross-sectional showing of a stiffener bead manufactured by a second practice followed in the prior art.

The prior art method of fabricating composite structural members, such as panels, having stiffener beads therein is shown in FIGS. 2 and 3.

When stiffener beads were used in the prior art composite material structural members, the stiffener beads were shaped to be circular in cross-section and circular at their ends as illustrated in FIG. 2. Experience showed that when prepreg plies were laid up across such stiffener beads, it was not possible to have the ply conform precisely to the surface of the mold which defined the shape of the stiffener bead ends and, therefore, wrinkling and distortion of the ply occurred when this was attempted. Such wrinkling and distortion produced stress concentration areas in the finished product so that the product, therefore, is not fully unsatisfactory from a strength standpoint. To get the plies of the composite material to lay flat against the stiffener bead mold cavity 30, it was necessary to make a slit, such as shown at 32, in the first ply so laid up. The making of this slit is called "darting". Because of the presence of slit 32, it was now possible to cause the ply to conform to the shape of the stiffener bead cavity 30, however, a separation of the ply occurred along the darting line 32, such that a ply splice 34 had to be placed over the separated ply to effect a continuous ply. When the second ply was laid up, a darting line, such as 36, is cut therein and splice 38 is placed over the separation in that second ply to effect a joint between the separated portions of the ply. This darting and splicing procedure was followed with each ply lay-up. It will be evident that this method of ply lay-up utilizing darting and splicing is very labor intensive, and adds weight to the final product. Further, it can be demonstrated that when stress loads are applied to the composite material during flight operation of a helicopter or the like, the composite material will fracture at the darted and spliced regions before the remainder of the composite ply will fracture.

The second prior art method of ply lay-up is shown in FIG. 3 in which darting is shown to have occurred in ply 40 at station 42, and darting is shown to have occurred in ply 44 at station 46. To join these two plies 40 and 44 which have been separated by the darting process, a cap ply or splice 47 is applied thereacross as shown in FIG. 3. This process is also very time consuming, expensive and subject to the formation of stress concentrations in the darting and splicing area A further disadvantage of the prior art ply and splice constructions shown in FIGS. 2 and 3 is that, while one of the advantages of composite ply construction is that delamination of plies is detectable by visual inspection, this advantage is lost in this prior art construction since the splices cover up the plies in the area of potential delamination.

While an alternative to the use of stiffener beads would be to fabricate a panel member, such as 10, of sandwich construction, with a honeycomb layer between two outboard plate members, that construction is heavier and does not have the shear load carrying capability of the stiffener bead construction at the shear loads of interest in aircraft.

We have determined that composite structural members can be fabricated utilizing stiffener beads and avoiding the requirement for darting and splicing, and further avoiding the creation of ply wrinkling, and distortion by fabricating the stiffener beads 48, as shown in FIG. 4, so as to be concentric about axis 50 and to have straight and preferably parallel sides 52 and 54 and substantially elliptical ends 56 and 58.

As best shown in FIG. 5, stiffener bead 48 in cross-section defines the sector of a circle throughout the central portion thereof 60, between the elliptical ends 56 and 58. Further, as shown in FIG. 6, stiffener bead 48 joins the remainder of the structural member 49, of which it is an integral part, tangentially throughout the full periphery of the bead 48.

While the prior art beads were of cylindrical section with round ends, our elliptical ends provide a much gentler contour change by tapering from tip 56 into the central section 60 over a much longer distance, as shown in FIG. 7.

Our preferred dimensions are that the bead width W is substantially twice the width E of the elliptical ends and of the diameter of the circle which defines the tip 62 and 64 of the elliptical ends 56 and 58.

Figure 8:
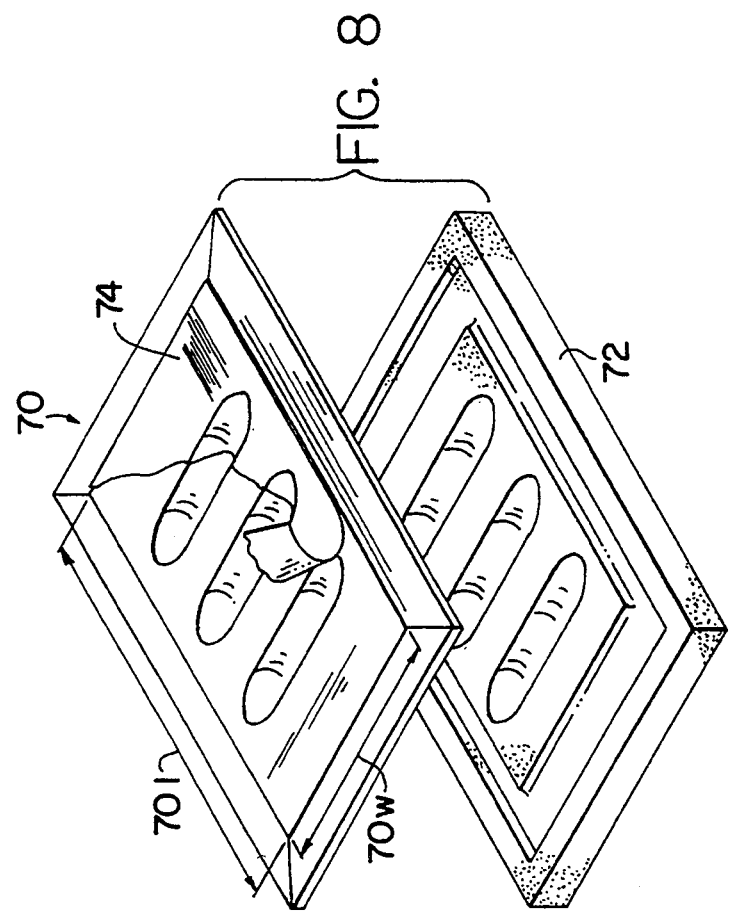

To describe the method of fabricating such a composite structural member 49 having our preferred stiffener bead 48 an integral part thereof, we will first consider FIG. 8. For purpose of description, we will describe the fabrication of a flat panel member with stiffener beads therein, however, it will be evident to those skilled in the art that the structural member could well be of any shape.

Viewing FIG. 8, we see a conformable caul plate 70 which has been prefabricated from fluoroelastomer material to define the shape of one of the sides or walls of the structural part 49 to be fabricated having our elliptically ended stiffener beads 48 therein.

Conformable caul 70 is fabricated as fully described in pending U.S. application Ser. No. 07/629,934 entitled The Method of Fabricating a Complex Part Made of Composite Material filed Dec. 19, 1990 in the name of Dublinski et al and assigned to the assignee hereof, the contents of which are hereby incorporated herein by reference.

Caul plate 70 preferably comprises five layers of fluoroelastomer which have been laid up upon a rigid model of the part to be fabricated. The model is made of fiberglass, wood, or other available material, which is capable of withstanding the desired heat and pressure necessary to vulcanize fluoroelastomer materials. Before these fluoroelastomer layers are laid up on that model, a separator release film is applied to the model. The first layer so laid up is preferably a 0.032 inch ply of release coated fluoroelastomer. The second ply is preferably a 0.030 inch ply of fluoroelastomer gum stock. The third and fourth plies are 0.040 inch plies of fluoroelastomer reinforced with aromatic polyamide fiber (such as KEVLAR®, a trademark of E.I. DuPont), while the fifth ply is the same as the second ply, thereby giving a total ply lay-up of 0.172 inches of reinforced fluoroelastomer for conformable caul 70. The material for each of these plies can be obtained, for example, from the the Minnesota Mining and Manufacturing Company of Minneapolis, Minn. The fluoroelastomer layers so laid up are debulked and then cured to form conformable caul 70.

The fabrication operation shown in FIG. 8 is to be the laying up of the prepreg plies of composite material, preferably woven fabric, which may be made of graphite, aromatic polyamide fiber, or fiberglass, or other suitable high tensile strength material preimpregnated with a resin, preferably as epoxy. It is important that each ply so laid up extend for the full length 70*l* and 70*w* of conformable caul 70 and that it project continuously and uninterruptedly into beads 48.

Because caul 70 has been fabricated so as to be highly conformable during the curing process eventually to be conducted, we find that it is preferable to provide a foam cradle 72, which has been fabricated to the same shape as the caul 70. Caul 70 is placed in cradle 72 during the lay-up operation of the various high tensile strength fabric plies or layers 74 across caul 70. Preferably, plies 74 are built up to a total thickness between 0.030" to 0.060" inches. We did our testing using a total ply thickness of 0.045".

While we prefer prepreg fabric, the fabric could be laid up dry and the resin added following lay-up.

Figure 9:
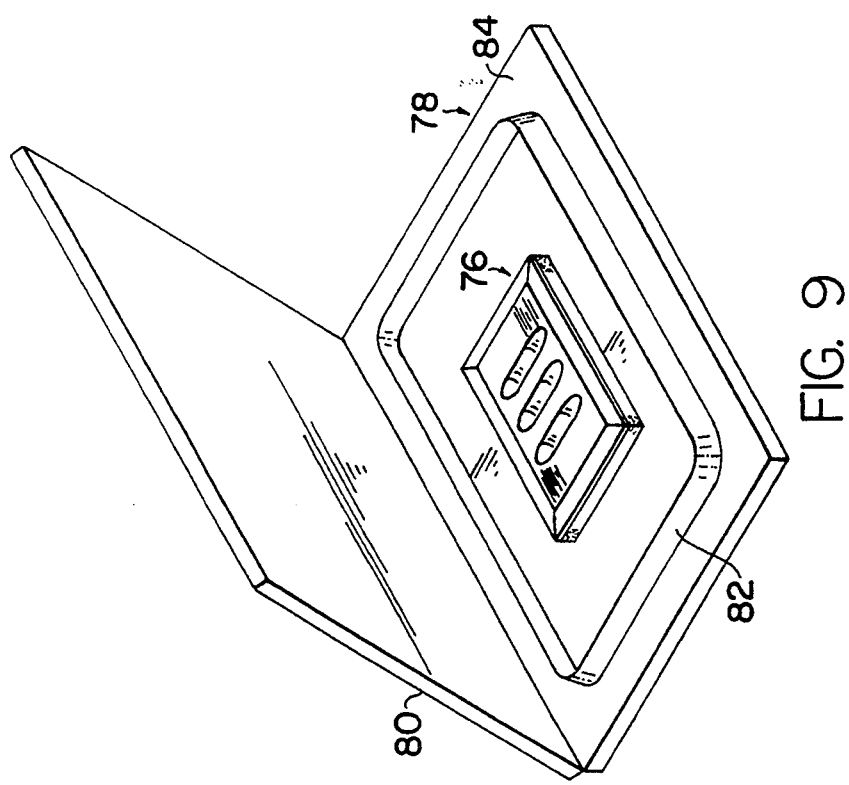

When all plies 74 have been laid up upon caul 70, the laid up caul 70, supported in cradle 72, will be debulked. This takes place as shown in FIG. 9 in which the cradle, caul and laid up ply unit 76 is positioned in vacuum tool 78 which operates so that when flexible elastomeric cover 80 is brought down and bears against knife-edged frame or seal 82, a vacuum can be applied in conventional manner in the area defined within seal 82 by cover 80 and base member 84 upon which seal 82 sits. The debulking process subjects assembly 76 to a substantial vacuum, for example, 14 psi so as to cause the plies to conform to the shape of caul 70 due to the vacuum action, and to extract air and any other type of gas bubbles which may be present in the prepreg plies.

When the debulking process has been completed, the conformable caul 70 with its debunked ply lay-ups thereon will be removed from cradle 72, and we will begin the assembly of parts necessary to result in the eventual curing of the structural member 49 with the stiffener beads 48 therein.

The next step in the fabrication of such a composite and beaded structural member 49 is shown in FIG. 10 in which the conformable caul member with its debulked composite plies thereon, which we will identify as 86, is to be placed upon metal tool or mold 88, which has a series of rubber-like plugs or mandrels 90 lying thereon in free floating relationship thereto and in alignment with the upwardly projecting stiffener beads 48 of member 86.

While conformable caul 70 has been fabricated to represent the desired shape for one side or surface of the product 49 under fabrication, tool 88 and plugs 90 cooperate to define the other side or surface of the composite structural part 49 under fabrication. When the conformable caul with debulked composite plies thereon 86 is brought into contact with tool 88, rubber-like plugs 90 will fit into beads 48, since they are prefabricated precisely to the shape of beads 48. Further, due to the conformability of caul 70 and the free floating state of plugs 90, the two parts are freely movable so that plug 90 will be centrally aligned within beads 48 of caul 70 when part 86 comes into contact with tool 88.

In our preferred method of fabrication, plugs or mandrels 90 may be hand placed within beads 48 of member 86 before member 86 is brought against tool 88 for the curing process. The resin tack will hold the free floating fluoroelastomeric plug 90 into the stiffener cavity 48 and against the prepreg fabric before and as member 86 is being brought into contact with tool 88.

Plugs 90 may be made of a silicone or a fluoroelastomer, but are preferably made of fluoroelastomer gum stock MfE-1742 made by Passaic Rubber Company of Wayne, N.J., or fluoroelastomer gum stock CRP-8306 made by Chemprene of Beacon, N.Y. Elastomeric plugs or mandrels 90 can be cast or extended, but are preferably compression molded.

When the conformable caul with debulked composite plies 86 is in proper position against tool or mold 88 with rubber-like plugs or mandrels 90 positioned within beads 48, the entire unit is placed into a one-piece silicone vacuum bag and than wheeled into an autoclave where it is cured at 350° F. for a period of 60–120 minutes under a gage pressure of 75 psi. During this curing process, the free floating quality of plugs 90 and the conformability of caul 70 will not only permit the plugs 90 to continue to center themselves within the beads, but as the plugs 90 expand under the heat and pressure of the curing process, the plugs will cause the composite material plies to come into contact with the entire surface of beads 48 without wrinkles or distortion so that the product so produced is a structural composite member made of bonded layers or plies of high strength woven fabric which are continuous throughout the length and width of the member and which are continuous and uninterrupted in forming integral beads 48 to the desired shape shown in FIG. 4. This relocation and expansion of plugs 90 also take care of any ply variation or irregularity. It will be evident to those skilled in the art that these advantages gained by use of the combination of the conformable caul 70 and elastomeric plugs 90 would not be gained if the caul and plugs were made of metal since the first contact between high spots in these metallic parts would prevent further motion therebetween.

After the cure cycle is complete, the vacuum bag will be stripped away, and then as shown in FIG. 11, the caul plate 70 is removed and the finished composite structural part 49, which consists, in this instance, of flat wall member 94 and integral stiffener beads 48 fabricated solely from resin bonded plies or layers of woven fabric made of high tensile strength material, such as graphite, fiberglass and aromatic polyamide fiber. Beads or mandrels 90 are separated from the part 49 and remain with mold 88 to receive the next conformable cauls with debulked ply lay-up 86 to be cured.

To assure that the various parts can be separated after the curing process takes place, a release agent is imbedded in caul plate 70 and the elastomer plugs 90, and a release film is sprayed onto the metal plate or tool 88.

One of the advantages of our method of fabrication is that a plurality of caul plates is 70 may be fabricated and the ply lay-up process on each may take place at any convenient time, and stored in a cool place so that the caul with debulked plies thereon is ready to be cured in cooperation with tool 88 at a time convenient to the manufacturer. Accordingly, expensive tool 88 and the autoclave are not tied up during caul ply lay-up time, but only during the curing time.

Figure 12:
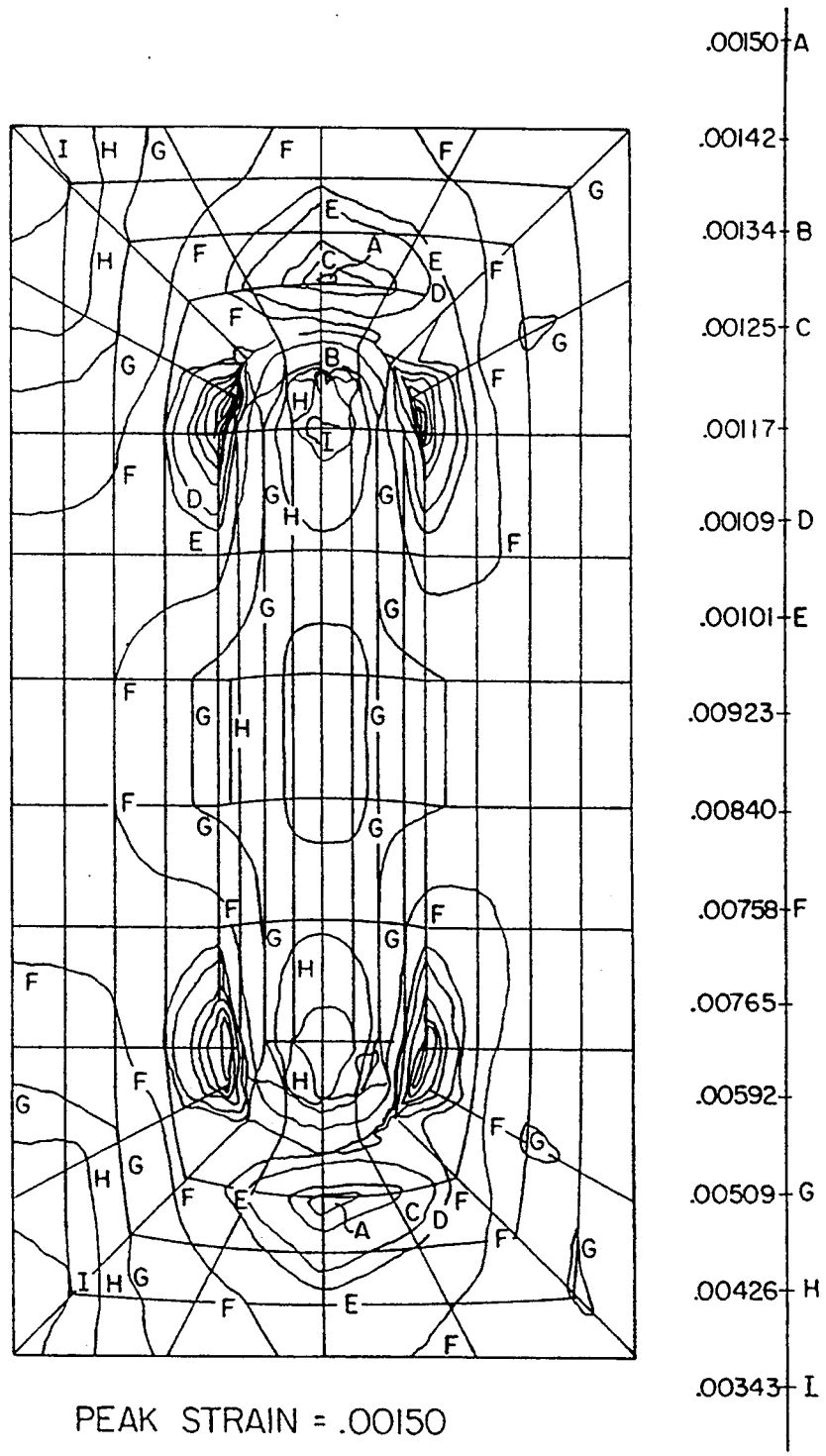
FIG. 12 is a strain contour plot of tests conducted on a composite panel constructed of the prior art round end stiffener beads.
Figure 13:
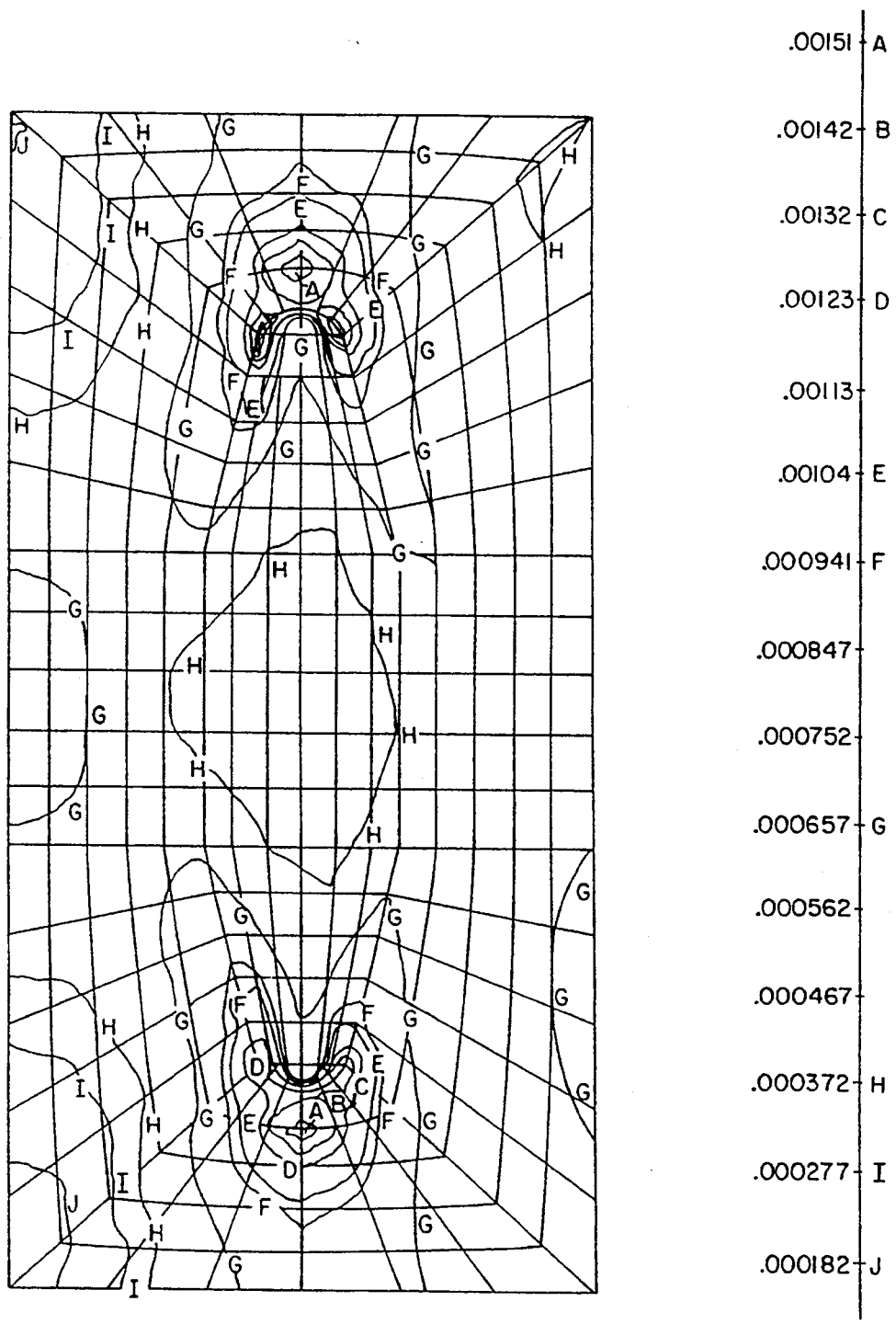
FIG. 13 is a strain contour plot developed during testing of a composite panel fabricated utilizing our improved elliptically ended stiffener bead.

We did analysis and testing of the prior art round ended stiffener bead and our elliptical ended stiffener beads. The first of these tests was performed utilizing structural analysis of both and, as shown in FIG. 13, which represents our elliptical end bead, and FIG. 12, which represents the prior art round end bead, the stresses in each configuration are substantially the same, whereas it would be expected that with the reduced width of our elliptical end beads, the stress would be greater. FIGS. 12 and 13 show that the bead shape does not adversely affect the strain field.

Further, shear panels manufactured by our process and having our elliptical ended beads were tested, along with the prior art construction. These tests showed that our new elliptical ended bead panel is stronger than the prior art round ended panel in that our panel failed at a shear load of 186 Newtons per millimeter as a general stability failure, whereas the prior art round ended panel failed at a shear load of 141 Newtons per millimeter, and these failures occurred at the stress risers caused at the ply splice.

To demonstrate the feasibility of our improved elliptical end stiffener bead, we built and tested two panels of composite material. One panel utilized the prior art round end stiffener bead, and the other used our improved elliptical end stiffener bead. These panels were tested under 100 lb. per inch of load, and a strain contour plot for the prior art construction is shown in FIG. 12, while a strain contour plot for our improved elliptical end stiffener bead construction is shown in FIG. 13. These plots show a series of continuous lines of constant strain. The significance of these strain contour plots is that they demonstrate that the maximum strain generated in our elliptical end stiffener bead panel is substantially the same as that generated in the prior art panel. The strain generated in our improved panel is 0.00151, while 0.00150 is the strain generated in the prior art panel. This is an unexpected advantage for our improved panel in that we anticipated that the narrower elliptical end stiffener beads would generate substantially more strain, and it is demonstrated in FIGS. 12 and 13 that this is not the case. Further, FIGS. 12 and 13 show that while the strain pattern is shifted somewhat between the prior art round end stiffener bead construction and our improved elliptical end stiffener bead construction, the degree of strain is virtually unchanged.

We claim:

1. The method of fabricating a wall member comprising bonded plies of high strength woven fabric and having at least one elongated stiffener bead therein, which stiffener bead has two parallel sides and two substantially elliptical ends extending smoothly from the sides, wherein the stiffener bead sides and ends join the wall member tangentially, and wherein the stiffener bead displacement from the wall member between the sides defines a sector of a circle, and further wherein the composite fabric forming the wall member is continuous and uninterrupted for the full length and width of the wall member and through the stiffener bead comprising the steps of:

a. providing a caul plate fabricated of fluoroelastomer material so as to be conformable under heat and pressure, and shaped to define one of two opposite surfaces of the wall member and stiffener bead being fabricated, said caul plate including a stiffener bead cavity formed therein;

b. laying up upon the caul plate a plurality of continuous and uninterrupted prepreg plies of high strength composite woven fabric each extending for the full length and width of the wall member under fabrication and into the stiffener bead;

c. debulking the caul plate with the prepreg plies laid up thereon;

d. providing a metal member to serve as a mold portion;

e. providing a fluoroelastomeric plug contoured the precise shape of the other of said two opposite surfaces of the stiffener bead, and positioning the plug loosely upon the metal member so that the metal member and the plug cooperate to define the other of said two opposite surfaces of the wall member;

f. positioning the debulked caul plate with the composite material laid up thereon onto the metal plate so that the plug is positioned in the stiffener bead cavity so as to form an assembly for curing; and g. curing the assembly of the caul plate with the composite material so laid up thereon and the plug positioned in the stiffener bead cavity so that the conformable caul plate and plug cooperate as the plug expands under heat and pressure to cause the plug to bear against the composite plies as to cause the composite plies to bear against the full bead cavity other surface, and so as to thereby form the desired wall member with stiffener bead.

2. The method according to claim 1 wherein the high strength composite woven fabric is selected from the group consisting of graphite, fiberglass and aromatic polyamide fiber preimpregnated with resin.

3. The method according to claim 2 wherein the assembly is cured at a pressure of 75 psi and a temperature of 350° F.

4. The method according to claim 3 including the additional step of providing a cradle member selectively shaped so as to support the caul plate during the composite material lay-up process.

5. The method according to claim 1 wherein the plug is positioned in the stiffener bead cavity of the caul plate following ply lay-up, and before the caul plate so laid up and with the plug so positioned is brought into contact with the metal plate.

6. The method of fabricating a wall member comprising bonded plies of high strength woven fabric and having at least one elongated stiffener bead therein, which stiffener bead has two parallel sides and two substantially elliptical ends extending smoothly from the sides, wherein the stiffener bead sides and ends join the wall member tangentially, and wherein the stiffener bead displacement from the wall member between the sides defines a sector of a circle, and further wherein the composite fabric forming the wall member is continuous and uninterrupted for the full length and width of the wall member and through the stiffener bead comprising the steps of:

a. providing a caul plate fabricated of fluoroelastomer material so as to be conformable under heat and pressure, and shaped to define one of two opposite surfaces of the wall member and stiffener bead being fabricated, said caul plate including a stiffener bead cavity formed therein;

b. laying up upon the caul plate a plurality of continuous and uninterrupted dry plies of high strength composite woven fabric each extending for the full length and width of the wall member under fabrication and into the stiffener bead;

c. applying resin to the fibrous plies following lay-up to impregnate the plies;

d. debulking the caul plate with the impregnated plies laid up thereon;

e. providing a metal member to serve as a mold portion;

f. providing a fluoroelastomeric plug contoured to the precise shape of the other of said two opposite surfaces of the stiffener bead, and positioning the plug loosely upon the metal member so that the metal member and the plug cooperate to define the other of said two opposite surfaces of the wall member;

g. positioning the debulked caul plate with the composite material laid up thereon onto the metal plate so that the plug is positioned in the stiffener bead cavity so as to form an assembly for curing; and h. curing the assembly of the caul plate with the composite material so laid up thereon and the plug positioned in the stiffener bead cavity so that the conformable caul plate and plug cooperate as the plug expands under heat and pressure to cause the plug to bear against the composite plies as to cause the composite plies to bear against the full bead cavity other surface, and so as to thereby form the desired wall member with stiffener bead.

* * * * *